United States Patent
Liu et al.

(10) Patent No.: US 7,433,060 B2
(45) Date of Patent: Oct. 7, 2008

(54) METHOD FOR CORRELATING A STRUCTURAL PARAMETER OF A PLURALITY OF GRATINGS AND METHOD FOR DETERMINING A STRUCTURAL PARAMETER VALUE OF AN UNKNOWN GRATING USING THE SAME

(75) Inventors: An Shun Liu, Hsinchu (TW); Yi Sha Ku, Hsinchu (TW)

(73) Assignees: Industrial Technology Research Institute, Judung Township, Hsinchu County (TW); Accent Optical Technologies, Inc., Bend, OR (US)

( * ) Notice: Subject to any disclaimer, the term of this patent is extended or adjusted under 35 U.S.C. 154(b) by 293 days.

(21) Appl. No.: 11/454,869

(22) Filed: Jun. 19, 2006

(65) Prior Publication Data
US 2007/0014015 A1    Jan. 18, 2007

(30) Foreign Application Priority Data
Jul. 14, 2005    (TW) ............................... 94123865 A

(51) Int. Cl.
G01B 11/28    (2006.01)

(52) U.S. Cl. .................................... 356/630
(58) Field of Classification Search ................ 356/636, 356/625, 399, 609
See application file for complete search history.

(56) References Cited

OTHER PUBLICATIONS

Ravikiran Attota, Application of through-focus focus-metric analysis in high resolution optical metrology, Jun. 21, 2005, SPIE, vol. 5752, pp. 1441-1449.*

\* cited by examiner

Primary Examiner—Tarifur R Chowdhury
Assistant Examiner—Michael Lapage
(74) Attorney, Agent, or Firm—Volentine & Whitt, PLLC

(57) ABSTRACT

A method for correlating a structural parameter of a plurality of gratings acquires images from a plurality of gratings, which have different structural parameters. A focus metrics algorithm is then performed to find the off-focus offset of the orders of each grating from the intensity variation of these images, and the variation ratio of the off-focus offset to the order for each grating is calculated later. Consequently, the structural parameters of these gratings can be correlated based on the variation ratio of the off-focus offset to the order. The present method acquires images from an unknown grating at different off-focus offsets, and performs a focus metrics algorithm to find the off-focus offset of the orders of the unknown grating. The variation ratio is calculated and the structural parameter of the unknown grating is determined based on the variation ratio.

24 Claims, 5 Drawing Sheets

METHOD FOR CORRELATING A STRUCTURAL PARAMETER OF A PLURALITY OF GRATINGS AND METHOD FOR DETERMINING A STRUCTURAL PARAMETER VALUE OF AN UNKNOWN GRATING USING THE SAME

BACKGROUND OF THE INVENTION (A) Field of the Invention

The present invention relates to a method for correlating a structural parameter of a plurality of predetermined gratings and method for determining a structural parameter value of an unknown grating using the same, and more particularly, to a method for correlating a structural parameter of a plurality of predetermined gratings by through focus image acquisition and focus metrics algorithm and method for determining a structural parameter value of an unknown grating using the same.

(B) Description of the Related Art

With the rapid growth and development of the semiconductor industry, the requirement to reduce the critical dimension (CD) and line-width has gradually increased, and the precision of metrology tools must be raised to meet demands. According to Rayleigh criteria, it is quite difficult for conventional image metrology tools to meet the prospective resolution demands due to issues such as optical diffraction, precision of metrology tools and proximity effect. Consequently, it is necessary to find a new metrology to solve the above-mentioned problem.

In addition, the metrology tools for measuring line-width and pitch, such as critical dimension scanning electron microscopes (CD-SEM) and critical dimension atomic force microscopes (CD-AFM) offer very high resolution, but are too expensive for most applications. Users need cost-effective and efficient image metrology tools, which can achieve the same resolution as CD-SEM and CD-AFM.

SUMMARY OF THE INVENTION

The objective of the present invention is to provide a method for correlating a structural parameter of a plurality of predetermined gratings by through focus image acquisition and focus metrics algorithm techniques and method for determining a structural parameter value of an unknown grating using the same.

In order to achieve the above-mentioned objective and avoid the problems of the prior art, one embodiment of the present invention discloses a method for correlating a structural parameter of a plurality of predetermined gratings comprising steps of acquiring a plurality of images at a plurality of predetermined off-focus offsets from the predetermined gratings having different structural parameter values, performing a focus metrics algorithm to find the off-focus offsets corresponding to orders for each of the predetermined gratings based on the intensity variation, calculating a variation ratio of the off-focus offsets to the orders for each of the predetermined gratings, and correlating the variation ratio with the structural parameter of the predetermined gratings.

To determine the structural parameter value of an unknown gratings, the present method first generates a relation formula of a structural parameter to a variation ratio from a plurality of predetermined gratings by correlating the structural parameter with the variation ratio of off-focus offsets to orders of the predetermined gratings, and acquires a plurality of images from the unknown grating at a plurality of predetermined off-focus offsets. A focus metrics algorithm is then performed to find the off-focus offsets corresponding to orders for the unknown grating. A target variation ratio of the off-focus offsets to the orders for the unknown grating is calculated, and the structural parameter value of the unknown grating is determined by substituting the target variation ratio into the relation formula.

The prior art improves the resolution at the expense of slower measuring speed and higher cost. The present invention incorporates the through focus image acquisition and the focus metric algorithm to generate a relation formula between the structural parameter and the variation ratio of the off-focus offsets to the orders of the predetermined gratings, and the structural parameter value of an unknown grating can be determined by substituting the target variation ratio of the unknown grating into the relation formula. The present invention does not require expensive optical elements or probing elements, but uses the through focus image acquisition and the focus metric algorithm to improve the measurement resolution. Consequently, the present invention is simpler and offers more rapid data processing, and can be applied to conventional inexpensive image metrology tools without amending the hardware to offer a higher measurement resolution.

BRIEF DESCRIPTION OF THE DRAWINGS

The objectives and advantages of the present invention will become apparent upon reading the following description and upon reference to the accompanying drawings in which.

DETAILED DESCRIPTION OF THE INVENTION

FIG. 1(a) to FIG. 1(e) show a plurality of predetermined gratings having different structural parameter values. The line width/space for the gratings in FIG. 1(a) to FIG. 1(e) are 0.5 µm/0.5 µm, 0.5 µm/1.0 µm, 1.0 µm/1.0 µm, 1.0 µm/1.5 µm and 1.0 µm/2.0 µm, and the pitch for the grating in FIG. 1(a) to FIG. 1(e) are 1.0 µm, 1.5 µm, 2.0 µm, 2.5 µm and 3.0 µm.

Figure 1:
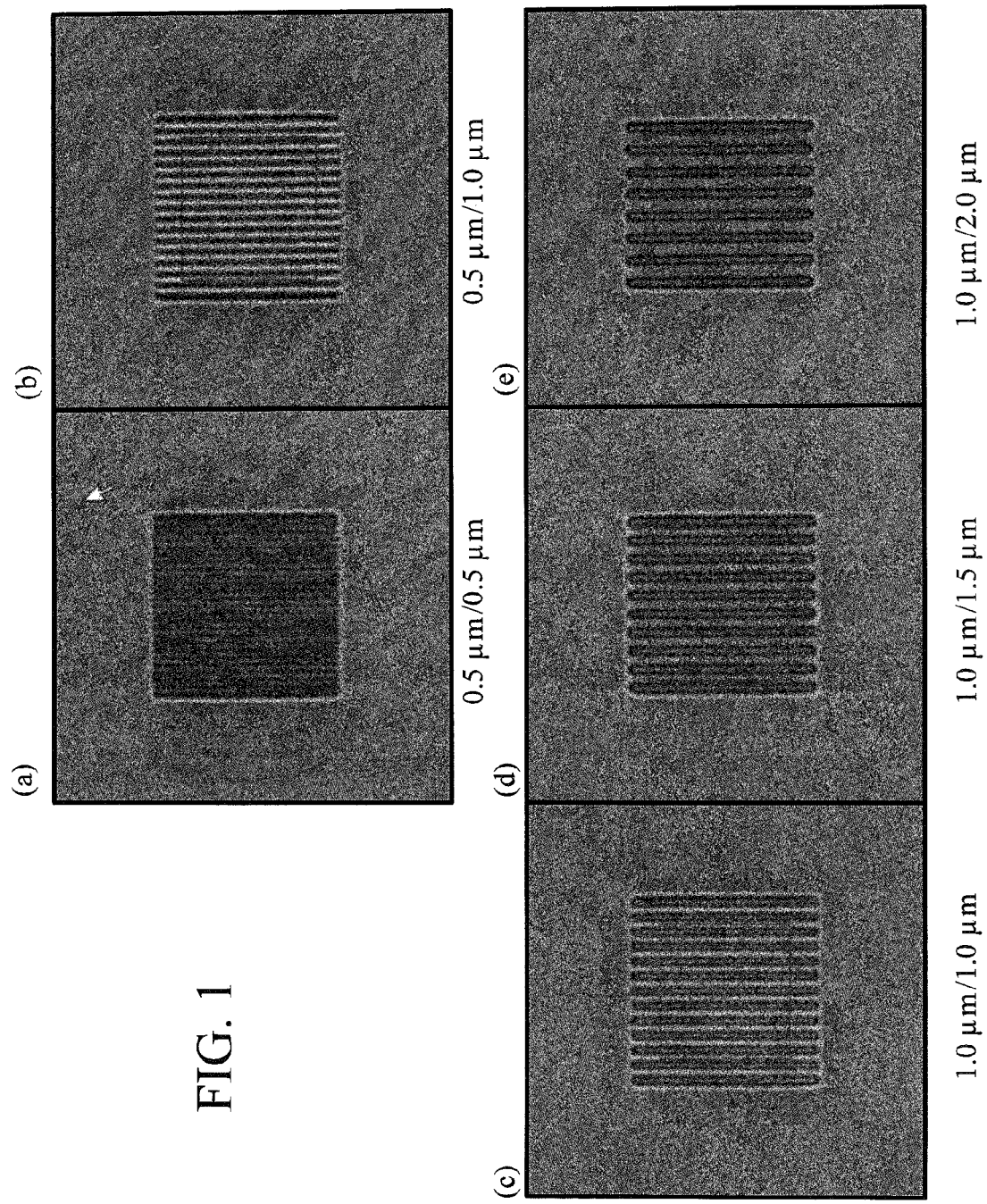
FIG. 1(a) to FIG. 1(e) show a plurality of predetermined gratings having different structural parameter values.
Figure 2:
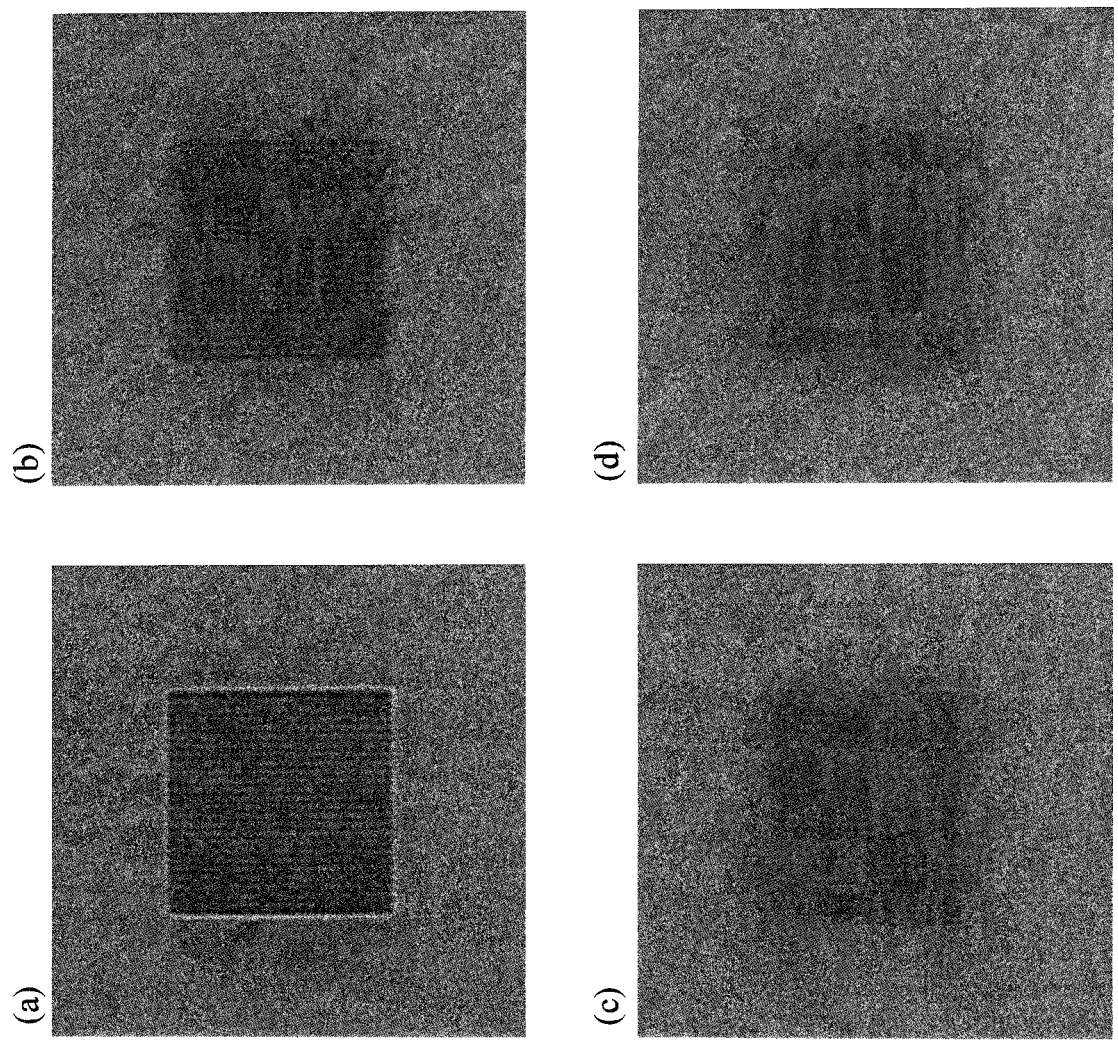
FIG. 2 illustrates some acquired images from a predetermined grating shown in FIG. 1(a) at off-focus offsets of 0, +2.0 µm, +5.0 µm and +10.0 µm.

FIG. 2 illustrates some acquired images from a predetermined grating shown in FIG. 1(a) at off-focus offsets of 0, +2.0 µm, +5.0 µm and +10.0 µm. The present method for correlating a structural parameter of a plurality of predetermined gratings first acquires a plurality of images from a plurality of predetermined gratings at a plurality of predetermined off-focus offsets. Particularly, acquiring images from these predetermined gratings shown in FIG. 1(a) to FIG. 1(e), which have different structural parameter values, can use through focus image acquisition, i.e., acquiring these images at a specific off-focus offset not only on focus. For example, FIG. 2(a) to FIG. 2(d) show some images acquired at off-focus offsets from −16.0 µm to +16.0 µm with an interval of 0.1 µm.

Figure 3:
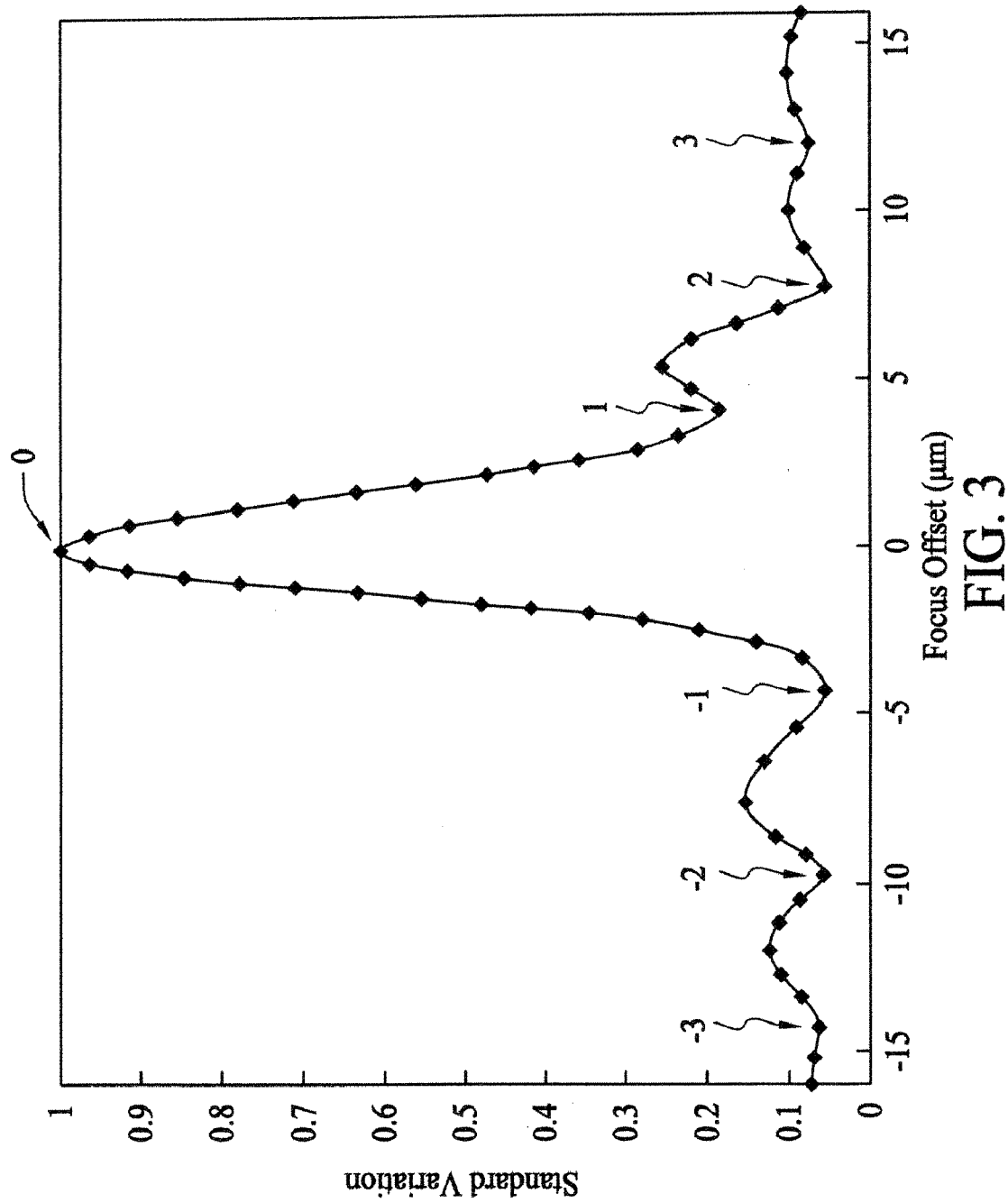
FIG. 3 shows the calculation result of the focus metric algorithm for the predetermined grating shown in FIG. 1(a)

FIG. 3 shows the calculation result of the focus metric algorithm for the predetermined grating shown in FIG. 1(a). The present method performs a focus metrics algorithm on these acquired images to find the off-focus offsets corresponding to orders for each of the predetermined grating. The focus metrics algorithm could be the gradient energy method, Laplacian method, standard deviation method, or contrast method. The following description uses the standard deviation method for example:

$$FM_{Std} = \sqrt{\frac{\sum_x \sum_y |g_i(x, y) - \overline{g}|^2}{n - 1}}$$

g represents the intensity of a pixel in the image, and $FM_{Std}$ represents the intensity standard deviation between pixels in the image. The intensity standard deviation is calculated by substituting the intensity of each pixel in a predetermined region of the image into the standard deviation formula. The focus metric algorithm is performed on images at different off-focus offsets for one of the predetermined gratings shown in FIG. 1(a) to generate a relation curve between the intensity standard deviation and the off-focus offset, as shown in FIG. 3. Since the relation curve is similar to a diffraction spectrum, the maximum intensity standard deviation is set as 0 order, and local minimum intensity standard deviations are set as −3 order, −2 order, −1 order, 1 order, 2 order and 3 order. Subsequently, the off-focus offsets corresponding to these orders having local minimum intensity standard deviation are determined.

Figure 4:
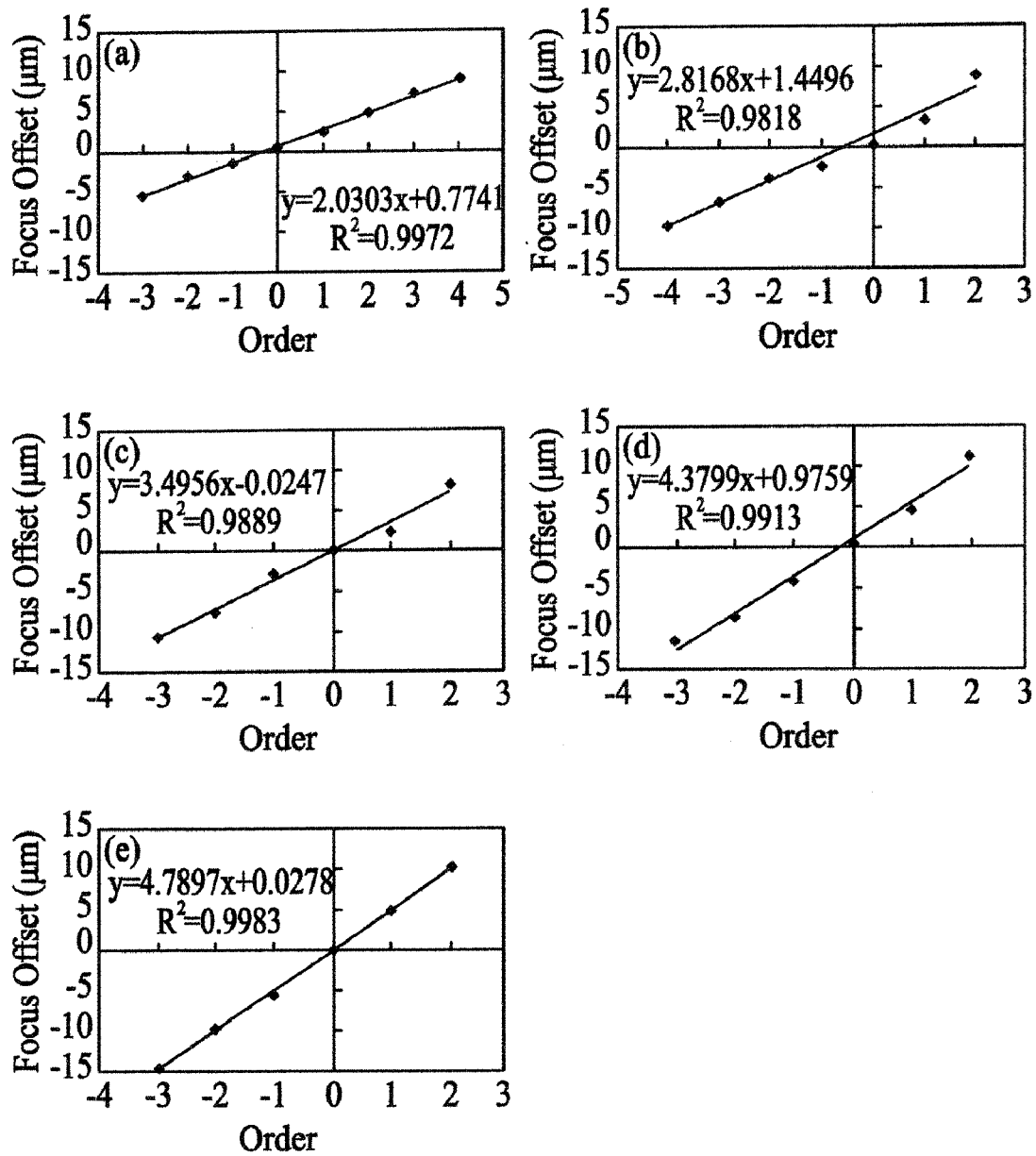
FIG. 4 shows the relation between the off-focus offset and the order for each of the predetermined grating.

FIG. 4 shows the relation between the off-focus offsets and the orders for each of the predetermined grating. After setting the orders and determining the off-focus offsets corresponding to these orders for each predetermined grating, the present method uses the least square method to calculate a variation ratio of the off-focus offsets to the orders, i.e., the slope of the curve in FIG. 4. Particularly, the variation ratio of the off-focus offset to the orders for the predetermined gratings increases with the pitch. The pitch is illustrative only; other structural parameters such as line width, thickness or line-to-space ratio can also be used according to the present method.

Figure 5:
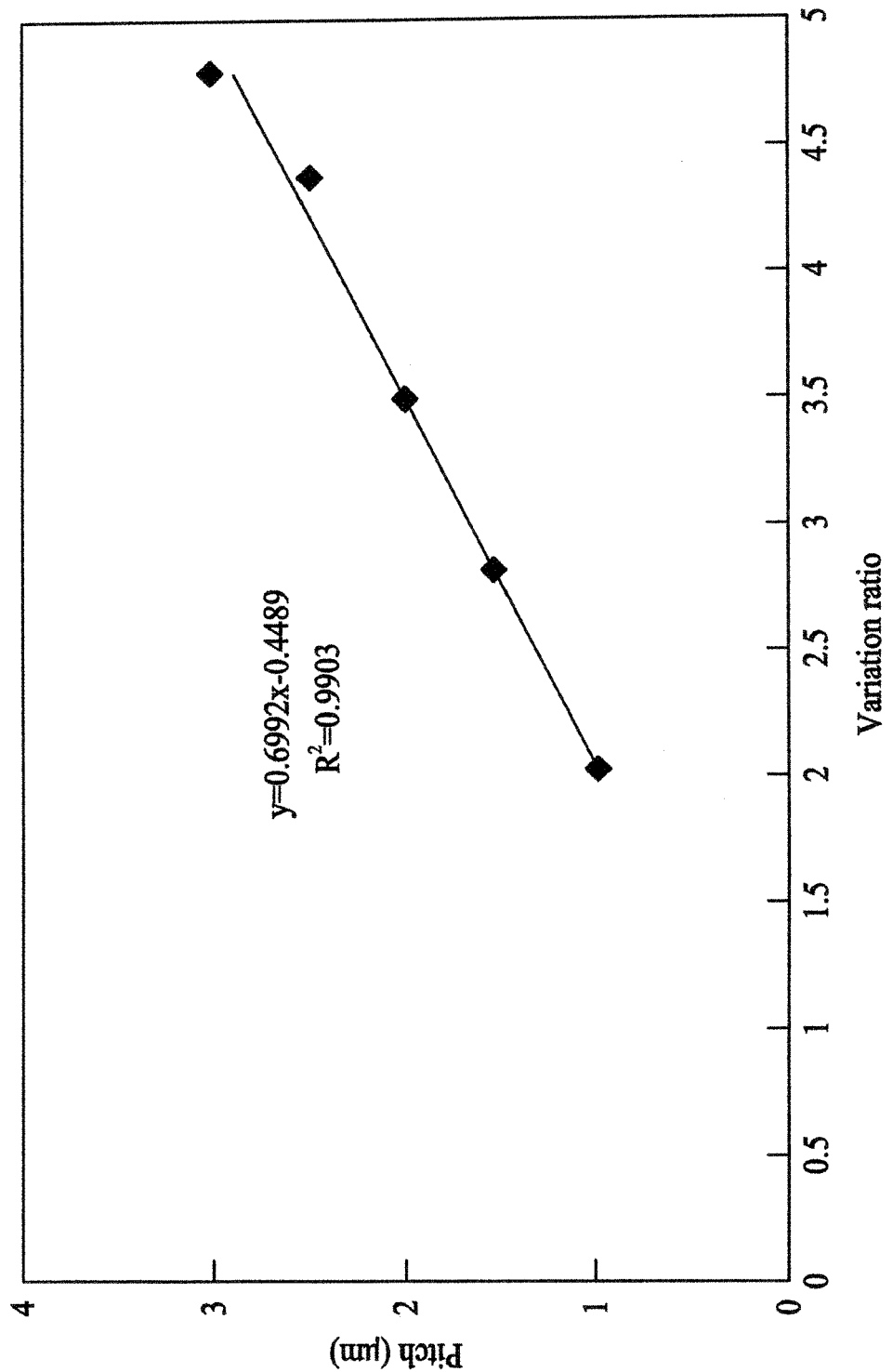
FIG. 5 shows the relation between the variation ratio and the structural parameter.

FIG. 5 shows the relation between the variation ratio and the structural parameter (pitch) of the predetermined grating. Obviously, the relationship between the pitch and the variation ratio is substantially linear. The present method selectively uses the least square method to correlate the pitches and the variation ratios of these predetermined gratings to generate a relation formula: y=0.6992x−0.4489 wherein y represents the pitch and x represents the variation ratio. Accordingly, the present invention can be used to determine the structural parameter value for an unknown grating by acquiring a target variation ratio of the off-focus offsets to the orders for the unknown grating and substituting the target variation ratio into the relation formula.

Particularly, to determine the structural parameter value of the unknown grating, the present method first generates a relation formula of a plurality of predetermined gratings having different structural parameter values, and acquires a plurality of images from the unknown grating at different off-focus offsets. The focus metrics algorithm is performed to find the off-focus offsets corresponding to the orders for the unknown grating. The target variation ratio of the off-focus offsets to the orders is then calculated, and the structural parameter value of the unknown grating is determined by substituting the target variation ratio into the relation formula.

Further, the relationship between the pitches and the variation ratios for the predetermined grating are substantially linear, and liner interpolation can be used to estimate the pitch of the unknown grating. In cases where the pitch of the unknown grating is too small and the target variation ratio is outside of the experimental region, i.e., the pitch is smaller than 1.0 µm and the target variation ratio is smaller than 2, linear extrapolation can be used to estimate the pitch since the linear relationship. In other words, since the relationship between the pitches and the variation ratios for the predetermined grating are substantially linear, the present invention can use linear extrapolation to overcome the limitations of optical diffraction, metrology tool precision, and the proximity effect.

The prior art improves the resolution at the expense of slower measuring speed and higher cost. The present invention incorporates through focus image acquisition and the focus metric algorithm to generate a relation formula between the structural parameter and the variation ratio of the off-focus offsets to the orders of the predetermined gratings, and the structural parameter value of an unknown grating can be determined by substituting the target variation ratio of the unknown grating into the relation formula. The present invention does not require expensive optical elements or probing elements, but uses through focus image acquisition and the focus metric algorithm to improve measurement resolution. Consequently, the present invention is simpler and offers more rapid data processing, and can be applied to conventional inexpensive image metrology tools without amending the hardware to offer higher measurement resolution.

The above-described embodiments of the present invention are intended to be illustrative only. Numerous alternative embodiments may be devised by those skilled in the art without departing from the scope of the following claims.

What is claimed is:

1. A method for correlating a structural parameter of a plurality of predetermined gratings, comprising steps of:
   acquiring a plurality of images from the predetermined gratings at a plurality of predetermined off-focus offsets, wherein the predetermined gratings have different structural parameter values;
   performing a focus metrics algorithm to find the off-focus offsets corresponding to orders for each of the predetermined gratings;
   calculating a variation ratio of the off-focus offsets to the orders for each of the predetermined gratings; and
   correlating the variation ratio with the structural parameters of the predetermined gratings.

2. The method for correlating a structural parameter of a plurality of predetermined gratings according to claim 1, wherein the step of acquiring a plurality of images from the predetermined gratings at a plurality of predetermined off-focus offsets uses a through focus image acquisition technique.

3. The method for correlating a structural parameter of a plurality of predetermined gratings according to claim 1, wherein the focus metrics algorithm uses a standard variation method to calculate an intensity standard variation for each of the images.

4. The method for correlating a structural parameter of a plurality of predetermined gratings according to claim 3, wherein the orders possess a local minimum value of the intensity standard variation.

5. The method for correlating a structural parameter of a plurality of predetermined gratings according to claim 1, wherein the step of correlating the variation ratio with the structural parameter of the predetermined gratings is performed using a least square method.

6. The method for correlating a structural parameter of a plurality of predetermined gratings according to claim 1, wherein the structural parameter is periodicity.

7. The method for correlating a structural parameter of a plurality of predetermined gratings according to claim 1, wherein the structural parameter is pitch.

8. The method for correlating a structural parameter of a plurality of predetermined gratings according to claim 1, wherein the structural parameter is thickness.

9. The method for correlating a structural parameter of a plurality of predetermined gratings according to claim 1, wherein the structural parameter is line-to-space ratio.

10. The method for correlating a structural parameter of a plurality of predetermined gratings according to claim 1, wherein the structural parameter is width.

11. The method for correlating a structural parameter of a plurality of predetermined gratings according to claim 10, wherein the width is line width.

12. The method for correlating a structural parameter of a plurality of predetermined gratings according to claim 10, wherein the width is critical dimension.

13. A method for determining a structural parameter value of an unknown grating, comprising steps of:
    generating a relation formula of a structural parameter to a variation ratio from a plurality of predetermined gratings by correlating the structural parameter with the variation ratio of off-focus offsets to orders of the predetermined gratings having different structural parameter values;
    acquiring a plurality of images from the unknown grating at a plurality of predetermined off-focus offsets;
    performing a focus metrics algorithm on the images to find the off-focus offsets corresponding to the orders of the unknown gratings;
    calculating a target variation ratio of the off-focus offsets to the orders of the unknown grating; and
    deciding the structural parameter value of the unknown grating by substituting the target variation ratio into the relation formula.

14. The method for determining a structural parameter value of an unknown grating according to claim 13, wherein the step of acquiring a plurality of images from the unknown grating at a plurality of predetermined off-focus offsets is performed uses focus image acquisition technique.

15. The method for determining a structural parameter value of an unknown grating according to claim 13, wherein the focus metrics algorithm uses a standard variation method to calculate an intensity standard variation for each of the images.

16. The method for determining a structural parameter value of an unknown grating according to claim 15, wherein the orders possess a local minimum value of the intensity standard variation.

17. The method for determining a structural parameter value of an unknown grating according to claim 13, wherein the structural parameter is pitch.

18. The method for determining a structural parameter value of an unknown grating according to claim 13, wherein the structural parameter is periodicity.

19. The method for determining a structural parameter value of an unknown grating according to claim 13, wherein the structural parameter is thickness.

20. The method for determining a structural parameter value of an unknown grating according to claim 13, wherein the structural parameter is line-to-space ratio.

21. The method for determining a structural parameter value of an unknown grating according to claim 13, wherein the structural parameter is width.

22. The method for determining a structural parameter value of an unknown grating according to claim 21, wherein the structural parameter is line width.

23. The method for determining a structural parameter value of an unknown grating according to claim 21, wherein the structural parameter is critical dimension.

24. The method for determining a structural parameter value of an unknown grating according to claim 13, wherein the step of generating a relation formula of a structural parameter to a variation ratio from a plurality of predetermined grating comprises:
    acquiring a plurality of images from the predetermined gratings at a plurality of off-focus offsets;
    performing a focus metrics algorithm on the images to find the off-focus offsets corresponding to the orders for each of the predetermined gratings;
    calculating the variation ratio of the off-focus offsets to the orders for each of the predetermined gratings; and
    correlating the structural parameter with the variation ratio to generate the relation formula.

* * * * *